(12) United States Patent
Takai et al.

(10) Patent No.: US 10,897,577 B2
(45) Date of Patent: Jan. 19, 2021

(54) IMAGE CAPTURING SYSTEM, IMAGE CAPTURING APPARATUS, ILLUMINATION APPARATUS, AND CONTROL METHOD

(71) Applicant: CANON KABUSHIKI KAISHA, Tokyo (JP)

(72) Inventors: Junji Takai, Yokohama (JP); Yoshinobu Okano, Shiraoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 16/444,918

(22) Filed: Jun. 18, 2019

(65) Prior Publication Data

US 2019/0394378 A1 Dec. 26, 2019

(30) Foreign Application Priority Data

Jun. 26, 2018 (JP) .................................. 2018-121366
Jun. 26, 2018 (JP) .................................. 2018-121367

(51) Int. Cl.
*H04N 5/235* (2006.01)
*H04N 5/225* (2006.01)

(52) U.S. Cl.
CPC ......... *H04N 5/2352* (2013.01); *H04N 5/2256* (2013.01); *H04N 5/2351* (2013.01)

(58) Field of Classification Search
CPC .. H04N 5/2352; H04N 5/2351; H04N 5/2256; H04N 5/23245; H04N 5/23209; H04N 5/2354; H04N 5/243; H04N 5/2353
See application file for complete search history.

(56) References Cited

U.S. PATENT DOCUMENTS

| | | | |
|---|---|---|---|
| 6,252,602 B1 * | 6/2001 | Matsuda | G06F 3/04815 345/473 |
| 6,426,762 B1 * | 7/2002 | Nason | G06F 9/451 715/788 |
| 7,483,057 B2 * | 1/2009 | Grosvenor | H04N 5/23218 348/211.9 |
| 7,761,810 B2 * | 7/2010 | Shim | G06F 3/04886 715/827 |
| 8,254,704 B2 * | 8/2012 | Lu | G09G 5/14 382/232 |

(Continued)

FOREIGN PATENT DOCUMENTS

| | | |
|---|---|---|
| JP | 2009-276525 A | 11/2009 |
| JP | 2010-193498 A | 9/2010 |

*Primary Examiner* — Abdelaaziz Tissire
(74) *Attorney, Agent, or Firm* — Canon U.S.A., Inc. IP Division

(57) ABSTRACT

An image capturing system including an image capturing apparatus and an illumination apparatus further includes a first selection unit configured to select a first mode in which an amount of light emission of the illumination apparatus and an imaging sensitivity are automatically set, and a second mode in which the amount of light emission of and the imaging sensitivity are automatically set to be higher than in the first mode, a second selection unit configured to select a wireless communication mode in which a communication with one other different illumination apparatus is performed via a communication unit, and a non-communication mode in which a communication with any other different illumination apparatus is not performed, and a control unit configured to, in a case where one of the second mode and the wireless communication mode is selected, disable selection of the other one.

15 Claims, 9 Drawing Sheets

(56) References Cited

U.S. PATENT DOCUMENTS

| | | | | |
|---|---|---|---|---|
| 8,274,572 B2* | 9/2012 | Okamoto | ........... | H04N 5/23238 |
| | | | | 348/218.1 |
| 8,847,922 B1* | 9/2014 | Kurtz | ............. | G06F 3/041 |
| | | | | 345/175 |
| 9,118,832 B2* | 8/2015 | Parviainen | ....... | H04N 5/232945 |
| 10,073,262 B2* | 9/2018 | Nakai | ................ | G06K 9/00671 |
| 10,122,925 B2* | 11/2018 | Parviainen | ....... | H04N 5/232945 |
| 10,499,001 B2* | 12/2019 | Van Geel | ............. | H04N 5/247 |
| 10,516,823 B2* | 12/2019 | Kankaanpaa | ............. | G06T 7/70 |
| 2007/0288830 A1* | 12/2007 | Nakabayashi | ..... | H04N 5/23206 |
| | | | | 714/763 |
| 2010/0097488 A1* | 4/2010 | Suzuki | .................. | G09G 5/00 |
| | | | | 348/222.1 |
| 2010/0149378 A1* | 6/2010 | Suzuki | ................ | H04N 5/232 |
| | | | | 348/231.99 |
| 2010/0149399 A1* | 6/2010 | Mukai | ............... | H04N 1/32101 |
| | | | | 348/333.02 |
| 2010/0157107 A1* | 6/2010 | Iijima | ............... | H04N 5/23296 |
| | | | | 348/240.99 |
| 2010/0173678 A1* | 7/2010 | Kim | .................. | H04N 5/23216 |
| | | | | 455/566 |
| 2010/0238262 A1* | 9/2010 | Kurtz | .................... | H04N 7/142 |
| | | | | 348/14.01 |
| 2011/0158478 A1* | 6/2011 | Yamada | .................. | G06F 3/011 |
| | | | | 382/103 |
| 2012/0005630 A1* | 1/2012 | Ohba | ...................... | G09G 5/14 |
| | | | | 715/853 |
| 2012/0019433 A1* | 1/2012 | Inagaki | ................ | G06F 3/1454 |
| | | | | 345/1.1 |
| 2012/0052945 A1* | 3/2012 | Miyamoto | ............. | A63F 13/26 |
| | | | | 463/31 |
| 2013/0074000 A1* | 3/2013 | Liu | ........................ | G06F 3/0488 |
| | | | | 715/781 |
| 2014/0225918 A1* | 8/2014 | Mittal | ................... | G06F 3/017 |
| | | | | 345/633 |
| 2014/0375694 A1* | 12/2014 | Ohba | ....................... | G06T 3/40 |
| | | | | 345/660 |
| 2015/0248220 A1* | 9/2015 | Gottschlag | ........... | G06F 3/0488 |
| | | | | 715/716 |
| 2018/0270441 A1* | 9/2018 | Van Geel | .............. | H04N 5/268 |

* cited by examiner

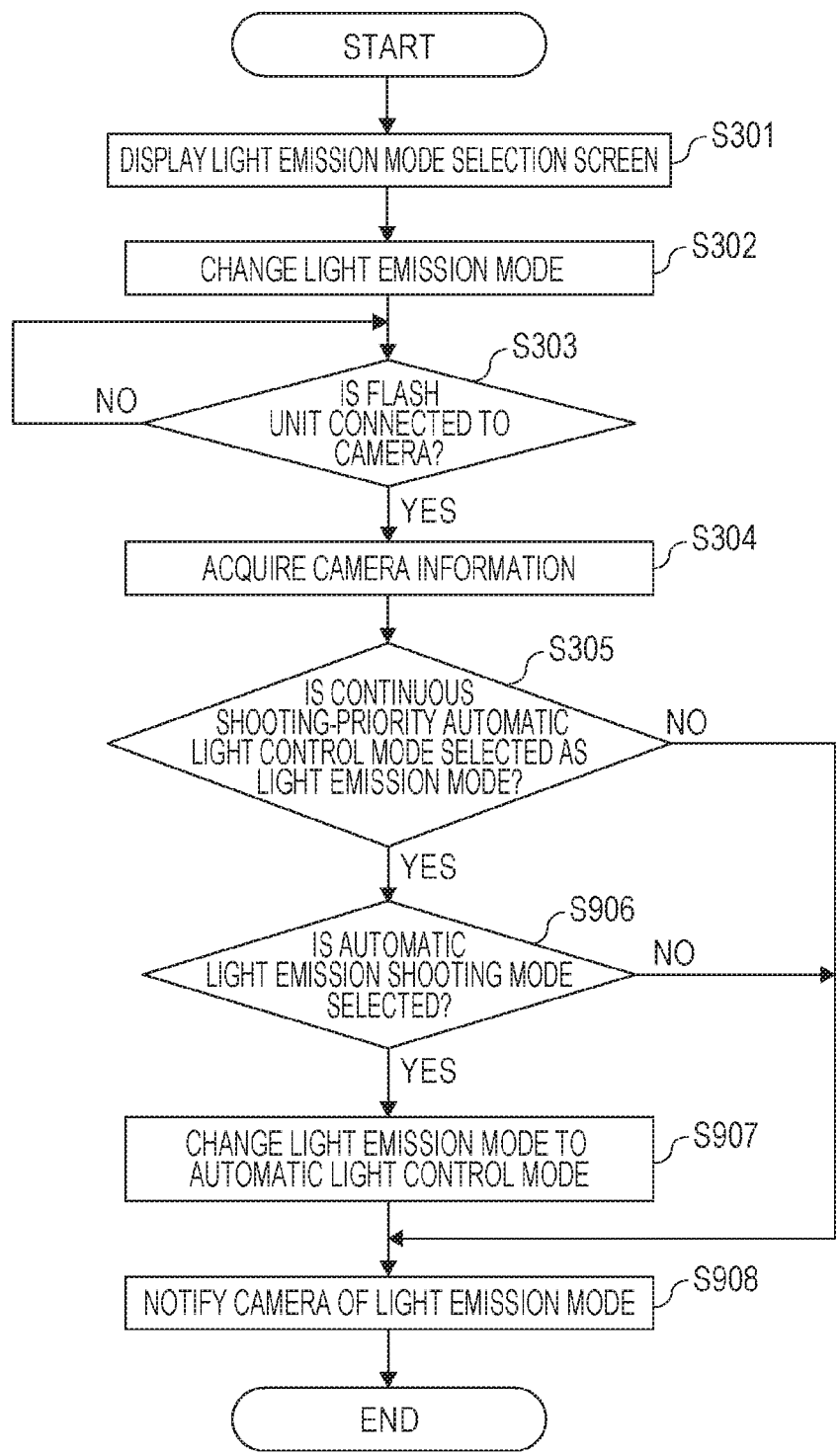

IMAGE CAPTURING SYSTEM, IMAGE CAPTURING APPARATUS, ILLUMINATION APPARATUS, AND CONTROL METHOD

BACKGROUND

Field of the Disclosure

The present disclosure generally relates to image capturing and, more particularly, to an image capturing system, an image capturing apparatus, an illumination apparatus, a control method, and to controlling of an illumination apparatus in an image capturing system including the illumination apparatus and an image capturing apparatus.

Description of the Related Art

Some of cameras, functioning as image capturing apparatuses for capturing a still image of a subject, are configured to control an image capturing operation such that when the luminance of the subject is low, an imaging sensitivity is increased or the subject is illuminated with light by emitting the light from a flash unit functioning as an illumination apparatus.

Japanese Patent Laid-Open No. 2010-193498 discloses a method in which the imaging sensitivity is switched depending on a focus position of an imaging lens.

However, in the technique disclosed in Japanese Patent Laid-Open No. 2010-193498, there is a possibility that the imaging sensitivity is set to be high even in a case where priority is given to picture quality and thus a high imaging sensitivity is unsuitable. On the other hand, if the imaging sensitivity is always set to be low, it becomes necessary to increase the amount of light emission of the illumination apparatus, and thus in a case where continuous shooting is performed while emitting light from the illumination apparatus, there is a possibility that an increase in a shooting interval may occur due to charging of the illumination apparatus or controlling of heat dissipation.

SUMMARY

In an aspect, the present disclosure provides an image capturing system including an image capturing apparatus and an illumination apparatus, the image capturing system further including a first selection unit configured to select a first mode in which an amount of light emission of the illumination apparatus is automatically set and an imaging sensitivity is automatically set, and a second mode in which the amount of light emission of the illumination apparatus is automatically set and the imaging sensitivity is automatically set to be higher than in the first mode, a communication unit configured to perform communication, a second selection unit configured to select a wireless communication mode in which a communication with one other different illumination apparatus is performed via the communication unit, and a non-communication mode in which a communication with any other different illumination apparatus is not performed via the communication unit, and a control unit configured to perform control such that in a case where one of the second mode and the wireless communication mode is selected, selection is disabled of the other one of the second mode and the wireless communication mode.

Further features of the present disclosure will become apparent from the following description of exemplary embodiments with reference to the attached drawings.

BRIEF DESCRIPTION OF THE DRAWINGS

FIG. 9 is a flow chart illustrating an operation of a flash unit in transmission/reception of information between a camera and the flash unit according to the fifth embodiment of the present disclosure.

DESCRIPTION OF THE EMBODIMENTS

Various exemplary embodiments, features, and aspects of the present disclosure will be described below with reference to the accompanying drawings.

Figure 1:
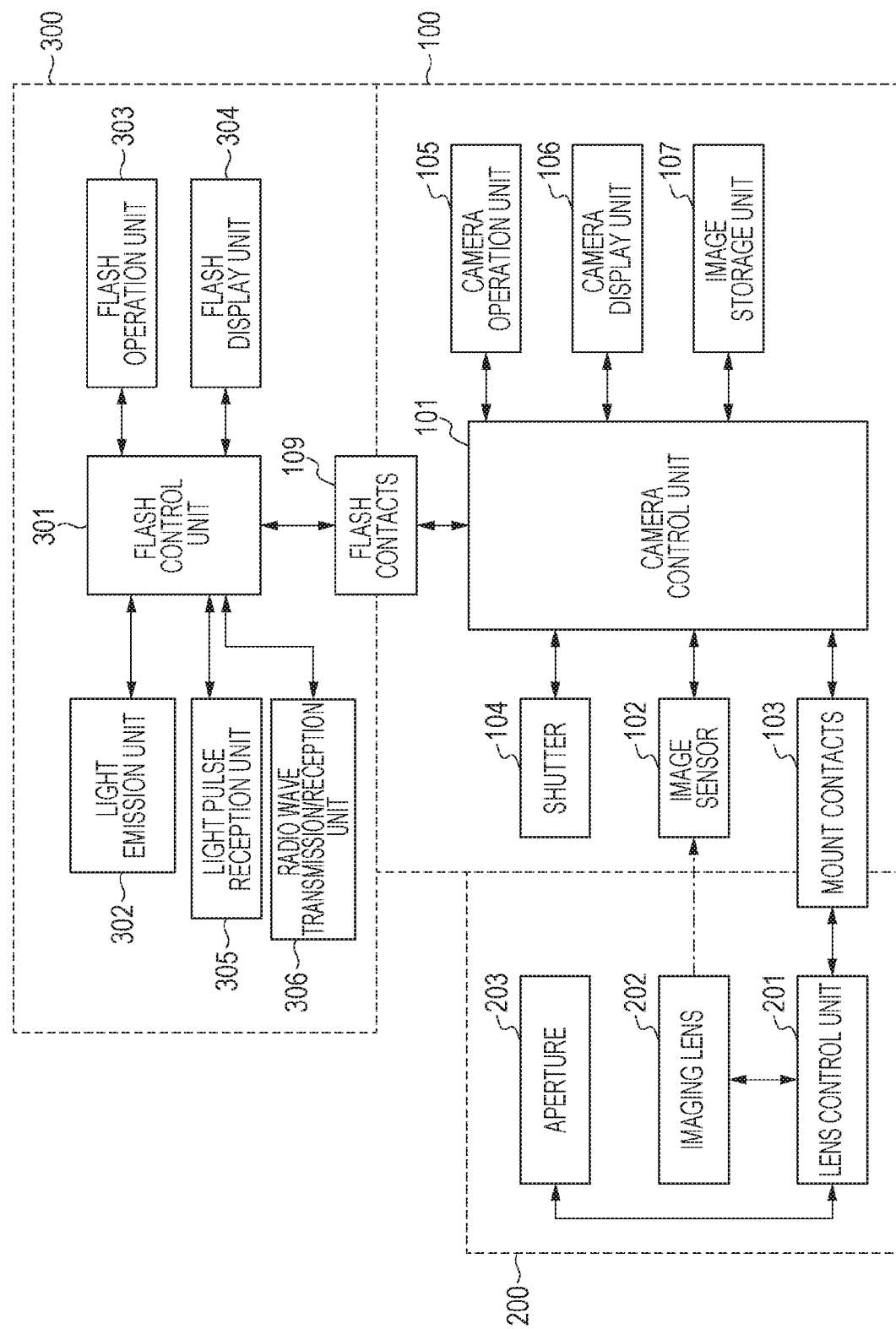
FIG. 1 is a diagram illustrating an example of a configuration of an image capturing system according to an embodiment of the present disclosure.

FIG. 1 is a diagram illustrating an example of a configuration of an image capturing system according to an embodiment of the present disclosure. The image capturing system includes a main camera unit 100, a lens unit 200, and a flash unit 300. A removable lens unit 200 is mounted on a front surface of the main camera unit 100 functioning as an image capturing apparatus. The main camera unit 100 and the lens unit 200 are electrically connected to each other via mount contacts 103. The flash unit 300, which is a removable illumination apparatus, is mounted on an upper surface of the main camera unit 100. The main camera unit 100 and the flash unit 300 are electrically connected to each other via flash contacts 109. In embodiments described below, the image capturing system is configured by way of example such that the lens unit and the flash unit are mountable/demountable on/from the main camera unit. However, in the image capturing system, at least one of the lens unit and the flash unit may be integrated with the main camera unit.

First, a configuration of the main camera unit 100 is described below. The camera control unit 101 is a microcomputer configured to control operations of various units of the main camera unit 100 according to a program stored in a memory.

An image sensor 102 is a CMOS sensor or a CCD sensor configured to convert light coming from a subject and incident on the image sensor 102 via an imaging lens 202 to an electric signal thereby generating image data. The resultant generated image data is output to the camera control unit 101.

A shutter 104 is disposed between the image sensor 102 and the imaging lens 202, and operates under the control of the camera control unit 101. The shutter 104 includes a first curtain and a second curtain including a plurality of shutter blades, and operates such that when the first curtain located ahead of the second curtain travels, the shutter opens and the image sensor 102 is exposed, while when traveling of the second curtain following the first curtain causes the shutter to close and thus light to the image sensor 102 is blocked. The exposure time of the image sensor 102 may be controlled by using an electronic shutter instead of at least one of the first and second curtains of the shutter 104.

A camera operation unit 105 includes an operation element operated by a user. An operation performed by a user is detected via a button, a switch, a dial, a connected device, or the like disposed on the main camera unit 100, and a signal corresponding to an operation instruction is output to the camera control unit 101. For example, the camera operation unit 105 outputs, to the camera control unit 101, an instruction signal which is generated when a user half-presses down a shutter release button (hereinafter, this instruction signal is referred to as a SW1 signal), and an instruction signal which is generated when a user fully presses down the shutter release button (hereinafter, this instruction signal is referred to as a SW2 signal).

A camera display unit 106 displays, under the control of the camera control unit 101, imaging information and a captured image on a display screen such as a liquid crystal panel, an organic EL panel, or the like.

The camera control unit 101, which may include one or more processors, one or more memories, circuitry, or a combination thereof (e.g. a central processing unit (CPU), a micro processing unit (MPU), or the like), may control, based on the output signal from the camera operation unit 105, the operation of the main camera unit 100, and issues an instruction to the lens unit 200 and the flash unit 300. In a case where the SW1 signal is output from the camera operation unit 105, the camera control unit 101 acquires image data by driving the image sensor 102 and measures the luminance of a subject from the acquired image data. The camera control unit 101 then determines, from a measurement result, exposure control values used in capturing an image such as a shutter speed, an aperture value, an International Organization for Standardization (ISO) sensitivity, and/or the like. The determined exposure control values are displayed on the display screen of the camera display unit 106. In a case where the SW2 signal is output from the camera operation unit 105, the camera control unit 101 sets the sensitivity (the ISO sensitivity) of the image sensor 102 by driving an aperture 203 of the lens unit 200 and starts an exposure of the image sensor 102 by controlling the shutter 104. After the exposure is completed, based on image data acquired from the image sensor 102, the camera control unit 101 performs control to display a captured image on the display screen of the camera display unit 106 and write the image data in an image storage unit 107 such as a memory card.

Next, a configuration of the lens unit 200 is described below.

The lens control unit 201 is a microcomputer configured to control operations of various parts of the lens unit 200 according to a program stored in a memory. The imaging lens 202 includes one or a plurality of lenses including a focus lens for adjusting a focus or the like, and forms a subject image on the image sensor 102. The imaging lens 202 further includes an aperture 203 for adjusting an amount of light incident on the image sensor 102. The lens control unit 201 controls the imaging lens 202 and the aperture 203 according to an instruction given by the camera control unit 101 through the mount contacts 103.

Next, a configuration of the flash unit 300 is described below.

A flash control unit 301, which may include one or more processors, one or more memories, circuitry, or a combination thereof, (e.g. a CPU, an MPU, or the like), may be a microcomputer configured to control operations of various parts of the flash unit 300 according to a program stored in a memory. The flash control unit 301 is capable of communicating with the camera control unit 101 via the flash contacts 109. The flash control unit 301 receives a light emission instruction or camera information from the camera control unit 101 and transmits flash unit information to the camera control unit 101. A light emission unit 302 includes a discharge tube functioning as a light source, a light emission capacitor, a light emission circuit, and a light emission optical system thereby being capable of performing flash light emission. Note that the light source may be a light emitting diode (LED) or the like capable of continuously emitting light.

The flash operation unit 303 includes an operation element operated by a user. The flash operation unit 303 detects an operation performed by a user via a button, a dial, or the like disposed on the flash unit 300, and outputs a signal corresponding to an operation instruction to the flash control unit 301. For example, a user is allowed to operate the flash operation unit 303 to set an automatic light control mode in which the camera automatically determines an amount of light emission, a continuous shooting-priority automatic light control mode in which the camera automatically determines an amount of light emission suitable for continuous shooting, and a manual light emission mode in which a user specifies an amount of light emission. The continuous shooting-priority automatic light control mode is a mode in which priority is given to reducing the amount of light emission compared with that in the automatic light control mode such that it is possible to perform continuous light emission a greater number of times than in the automatic light control mode. For example, the user can operate the flash operation unit 303 to select the automatic light control mode in which an amount of light emission of the illumination apparatus is automatically set and an imaging sensitivity is automatically set, and the continuous shooting-priority automatic light control mode in which the amount of light emission of the illumination apparatus is automatically set and the imaging sensitivity is automatically while giving priority to setting the imaging sensitivity to be higher or lower than in the automatic light control mode.

The flash display unit 304 displays a light emission mode and/or the like on a display screen such as a liquid crystal panel or an organic EL panel under the control of the flash control unit 301. The light pulse reception unit 305 receives a light pulse emitted by another flash unit or a light emission unit of a communication apparatus and outputs a reception result to the flash control unit 301.

According to an instruction given by the flash control unit 301, the light emission unit 302 drives a light emission circuit such that energy stored in a light emission capacitor is released to a discharge tube thereby illuminating a subject with flash light via a light emission optical system. The amount of light emission may be set by a user by operating the flash operation unit 303 or may be acquired via communication from the camera control unit 101 via the flash contacts 109. The flash control unit 301 is capable of making the light emission unit 302 emit light in response to receiving a control signal from the camera control unit 101 via the flash contacts 109 and in synchronization with an exposure operation of the main camera unit 100. Furthermore, the flash control unit 301 converts data into a predetermined pattern and drives the light emission unit 302 to emit light pulses with the pattern toward another different flash unit or a communication apparatus thereby transmitting data to this different flash unit or the communication apparatus. A flash control unit of the flash unit at the receiving side analyzes the light pulse pattern received by a light pulse reception unit thereby receiving the data. For example, in a case where the received data is a light emission command, the flash control unit of the flash unit at the receiving side emits light by driving a light emission unit according to the light emission command A radio wave transmission/reception unit 306 is a wireless module that makes it possible to perform bidirectional communication using a frequency, for example, in a 2.4 GHz frequency band. It is possible to transmit and receive data as with the communication using light described above. When communication with another different flash unit using a light pulse or a radio wave is performed, instead of directly communicating with a reception unit of this different flash unit, the communication may be performed via a communication apparatus connected to this different flash unit such that the communication apparatus effectively functions as a reception unit.

Note that an optical wireless mode in which light pulse pattern is emitted using the light emission unit 302 toward another flash unit or a communication apparatus and a radio wave wireless mode in which a radio wave is radiated using the radio wave transmission/reception unit 306 toward another flash unit or a communication apparatus may be set independently of the light emission mode. For example, in a communication mode selection screen, a user is allowed to operate the flash operation unit 303 to selectively set the optical wireless mode, the radio wave wireless mode, a wireless-off mode (a non-communication mode).

First Embodiment

Figure 2:
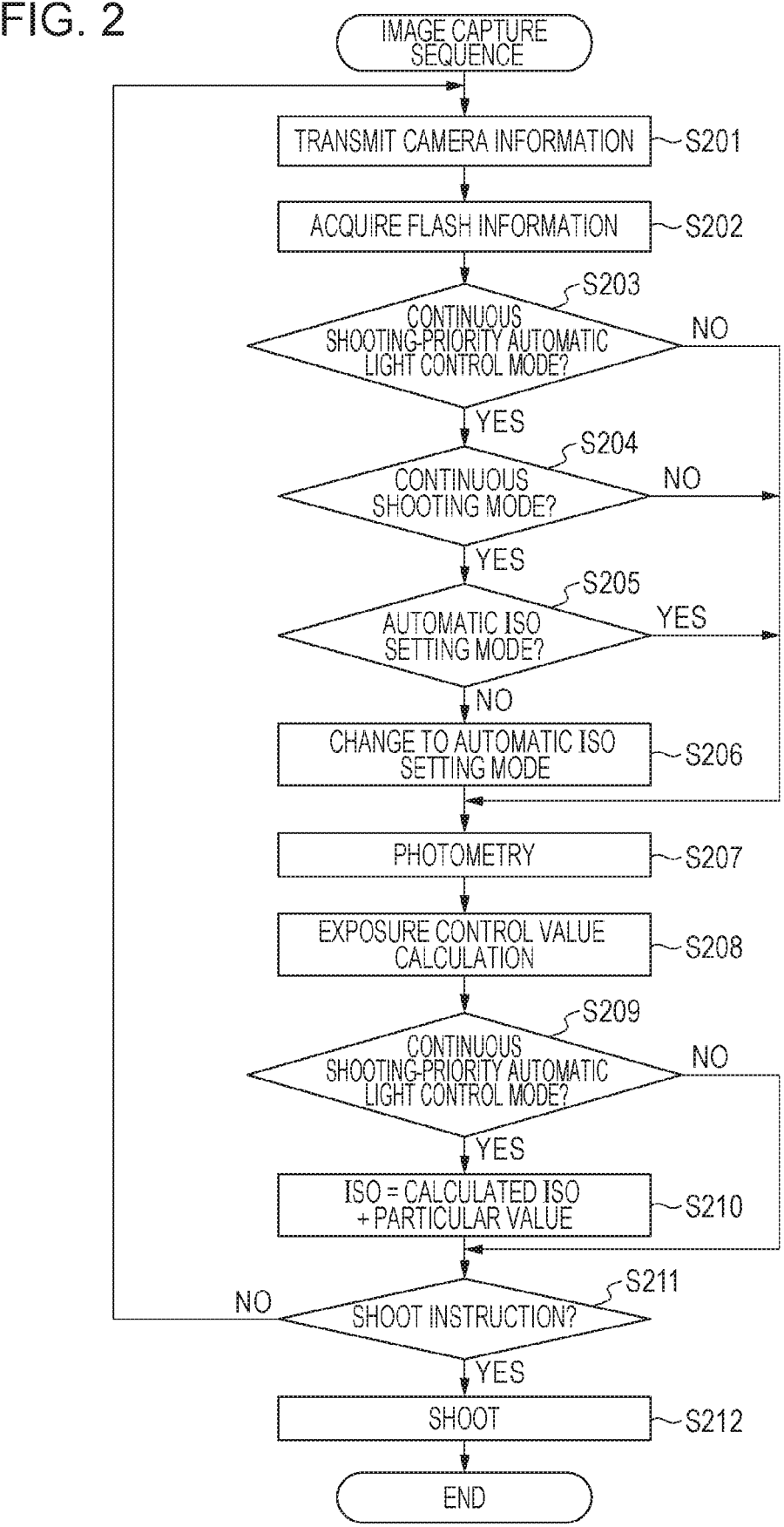
FIG. 2 is a flow chart illustrating an operation of an image capturing system according to a first embodiment of the present disclosure.

Referring to a flow chart shown in FIG. 2, an operation of an image capturing system according to a first embodiment of the present disclosure is described below. In the flow chart in FIG. 2, an operation of the camera control unit 101 is mainly shown. For example, when the output signal from the camera operation unit 105 is the SW1 signal, the operation is started.

First, in step S201, the camera control unit 101 transmits camera information to the flash unit 300. The camera information transmitted in this step is information including light emission mode information indicating light emission modes of the flash unit supported by the camera.

In step S202, the camera control unit 101 receives flash unit information from the flash unit 300. The flash unit information received in this step is information including information indicating a light emission mode of the flash unit, that is, information indicating which of the automatic light control mode, the continuous shooting-priority automatic light control mode, and the manual light emission mode the flash unit is set. Details of the transmission/reception of information in step S201 and step S202 will be described later.

In step S203, the camera control unit 101 determines whether the light emission mode of the flash unit indicated by the information received in step S202 is the continuous shooting-priority automatic light control mode. In a case where the light emission mode is the continuous shooting-priority automatic light control mode, the processing flow proceeds to step S204. In a case where the light emission mode is not the continuous shooting-priority automatic light control mode, the processing flow proceeds to step S207.

In step S204, the camera control unit 101 determines whether the continuous shooting is set. In a case where the continuous shooting is set, the processing flow proceeds to step S205. In a case where the continuous shooting is not set, the processing flow proceeds to step S207. The setting of the continuous shooting can be performed by a user by operating the camera operation unit 105. Set values (high/low continuous shooting speed or the like) are displayed on the camera display unit 106.

In step S205, the camera control unit 101 determines whether an imaging sensitivity (ISO sensitivity) setting mode is an automatic setting mode in which the ISO sensitivity is automatically set or a manual setting mode in which a user sets the ISO sensitivity to an arbitrary value. In a case where the automatic setting mode is set, the processing flow proceeds to step S207. In a case where the manual setting mode is set, the processing flow proceeds to step S206. The ISO sensitivity setting mode can be set by a user by operating the camera operation unit 105. The value of the ISO sensitivity, when in the manual setting mode, can be set by a user by operating the camera operation unit 105. The ISO sensitivity setting mode and the set value are displayed on the camera display unit 106.

In step S206, the camera control unit 101 changes the ISO sensitivity setting mode from the manual setting mode to the automatic setting mode. When the ISO sensitivity is set in the automatic setting mode, the camera control unit 101 is allowed to freely change the ISO sensitivity in an exposure control value calculation described later. Furthermore, the camera control unit 101 disables changing of the ISO sensitivity by a user. In this case, to inform a user that changing of the setting of the ISO sensitivity is disabled, a warning may be displayed, for example, by blinking the ISO sensitivity displayed on the camera display unit 106 or changing the color of indication of the ISO sensitivity.

In step S207, the camera control unit 101 performs photometric control to measure the luminance of a subject. In the photometric control, for example, image data is acquired by driving the image sensor 102, and the luminance of the subject is measured from the acquired image data. Alternatively, in a case of a configuration including a sensor for photometry, the luminance of a subject may be measured from a result of light sensed by the sensor for photometry.

In step S208, the camera control unit 101 calculates exposure control values used in capturing an image such as a shutter speed, an aperture value, an ISO sensitivity, or the like from the photometric measurement result obtained in step S207. The calculation of the exposure control values may be performed by using a known method, for example, by calculating values using a program diagram stored in advance.

In step S209, the camera control unit 101 determines whether the light emission mode of the flash unit received in step S202 is the continuous shooting-priority automatic light control mode. In a case where the light emission mode is the continuous shooting-priority automatic light control mode, the processing flow proceeds to step S210, but otherwise the processing flow proceeds to step S211.

In step S210, the camera control unit 101 performs a calculation of adding a particular value to the ISO sensitivity calculated in step S208, and employs the resultant calculation result as a new ISO sensitivity. Note that the adding the particular value to the ISO sensitivity calculated in step S208 is an example of a method of increasing the ISO sensitivity, and another method may be employed. For example, a second program diagram that provides a higher ISO sensitivity than is provided by the first program diagram used in step S208 may be used in step S210 such that the ISO sensitivity calculated in step S210 becomes greater than the ISO sensitivity calculated in step S208. Note that the particular value used in step S209 may be a fixed value or may be a value variable depending on the ISO sensitivity calculated in step S208.

The camera control unit 101 displays the shutter speed, the aperture value, and the ISO sensitivity calculated in step S208 or step S210 on the camera display unit 106. This makes it possible for a user to get to know the exposure control values that are set for use in capturing an image.

In step S211, the camera control unit 101 determines whether a shoot instruction has been issued. For example, if the shutter release button is fully pressed by a user and, as a result, thus SW2 signal is on, it is determined that a shoot instruction has been issued. In a case where it is determined that a shoot instruction has been issued, the processing flow proceeds to step S212, but otherwise the processing flow returns to step S201 to repeat the process.

In step S212, the camera control unit 101 performs shooting using the shutter speed, the aperture value, and the ISO sensitivity calculated in step S208 or step S210. Thereafter, the present process is ended. In a case where the light emission mode of the flash unit is the automatic light control mode or the continuous shooting-priority automatic light control mode, the camera control unit 101 determines the amount of flash light emission and transmits the determined amount of flash light emission to the flash control unit 301 via the flash contacts 109. The amount of flash light emission is determined, for example, such that a pre-light emission is performed and image data is acquired by driving the image sensor 102 in a period from the SW2 operation to the image capturing operation, and the amount of flash light emission is determined using a know method from the acquired image data and the shutter speed, the aperture value, and the ISO sensitivity to be used in the image capturing.

Figure 3:
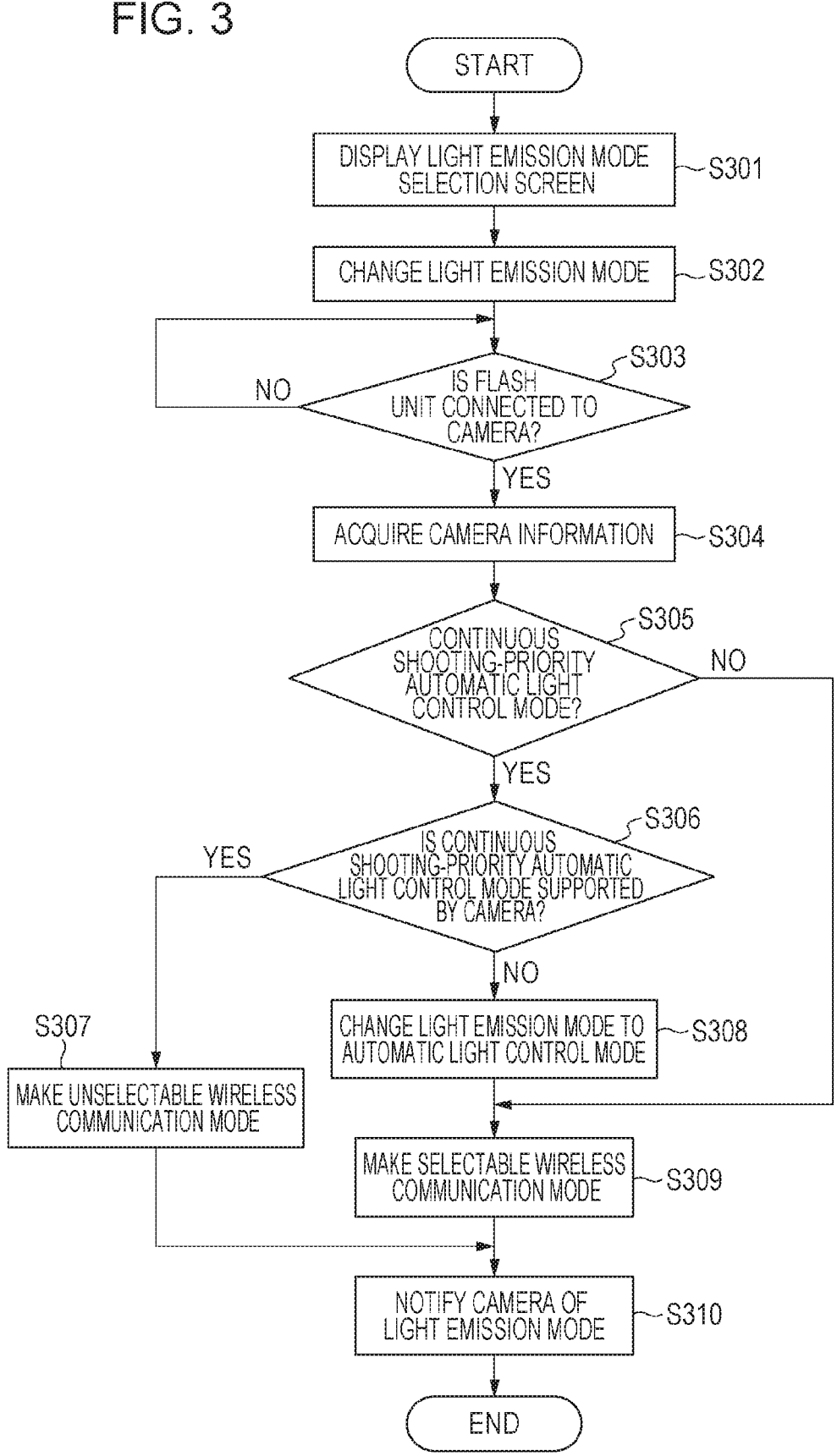
FIG. 3 is a flow chart illustrating an operation of a flash unit in transmission/reception of information between a camera and the flash unit according to the first embodiment of the present disclosure.

Subsequently, an operation of the flash unit 300 in terms of the transmission/reception of information between the main camera unit 100 and the flash unit 300 is described below with reference to a flow chart shown in FIG. 3. FIG. 3 illustrates a sequence mainly performed in step S201 or step S202 shown in FIG. 2.

In step S301, the flash control unit 301 displays a light emission mode selection screen on the flash display unit 304 in response to an operation performed on the flash operation unit 303 by a user. The light emission modes displayed on the light emission mode selection screen include the automatic light control mode, the continuous shooting-priority automatic light control mode, and the manual light emission mode. A user is allowed to freely select a light emission mode from the displayed light emission modes by operating the flash operation unit 303. Note that the light emission mode may be selected by using a dial or the like without displaying the light emission mode selection screen.

In step S302, the flash control unit 301 changes (sets) the light emission mode according to an operation performed on the flash operation unit 303 by a user.

In step S303, the flash control unit 301 determines whether the flash unit 300 is connected to the main camera unit 100 via the flash contacts 109. In a case where it is determined that the flash unit 300 is connected to the main camera unit 100, the processing flow proceeds to step S304, but otherwise step S303 is repeated.

In step S304, the flash control unit 301 receives camera information from the main camera unit 100. The camera information received in this step is information including light emission mode information indicating light emission modes of the flash unit supported by the camera.

In step S305, the flash control unit 301 determines whether the light emission mode which has been set as a result of the changing in step S302 is the continuous shooting-priority automatic light control mode. In a case where the light emission mode is the continuous shooting-priority automatic light control mode, the processing flow proceeds to step S306, but otherwise the processing flow proceeds to step S309.

In step S306, the flash control unit 301 determines, from the camera information received in step S304, whether the continuous shooting-priority automatic light control mode is supported by the main camera unit 100 to which the flash unit 300 is connected. In a case where the continuous shooting-priority automatic light control mode is supported, the processing flow proceeds to step S307, but otherwise the processing flow proceeds to step S308.

In step S307, the flash control unit 301 disables the selection of the wireless mode. The wireless mode (the wireless communication mode) includes both the optical wireless mode and the radio wave wireless mode described above, and thus when the selection of the wireless mode is disabled, neither one of the optical wireless mode and the radio wave wireless mode is unselectable. The unselectability of the wireless mode may be indicated by, in the communication mode selection screen, not displaying the wireless mode, displaying the wireless mode in color different from a color of the wireless-off mode, displaying a particular icon near the wireless mode, or any other methods that can cause a user to recognize that the wireless mode is unselectable.

In step S308, the flash control unit 301 changes the light emission mode to the automatic light control mode. The light emission mode may be changed temporarily or the changed light emission mode may be maintained. Note that in the temporary change, the light emission mode is set to the automatic light control mode only when the flash unit is in the connection with the camera, but if it is detected that the camera is disconnected, the light emission mode is returned to the continuous shooting-priority automatic light control mode.

In step S309, the flash control unit 301 enables the selection of the wireless mode.

In step S310, the flash control unit 301 transmits, to the camera control unit 101, flash unit information indicating the selected light emission mode. Thereafter, the present process is ended.

As described above, when the light emission mode of the flash unit is the continuous shooting-priority automatic light control mode, the image capturing is performed in a condition in which the ISO sensitivity is increased and the amount of light emission of the flash unit is reduced. This allows it to perform shooting with flash with exposure control values and an amount of light emission suitable for continuous shooting. Furthermore, the changing of the ISO sensitivity is completed before the shoot instruction is issued, and thus a user is allowed to check the imaging sensitivity before starting the image capturing.

Furthermore, also in the manual setting mode in terms of the setting of the ISO sensitivity, if it is detected that the light emission mode of the flash unit is the continuous shooting-priority automatic light control mode, the mode of setting the ISO sensitivity may be changed to the automatic setting mode. In this case, a user does not need to manually change the ISO sensitivity.

Furthermore, by enabling the setting of the continuous shooting-priority automatic light control mode as a light emission mode independently of other light emission modes, it becomes possible to explicitly inform a user that the controlling of the ISO sensitivity of the camera is performed in a mode different from other light emission manners.

Furthermore, in a case where the flash unit 300 is connected to a camera which does not support the continuous shooting-priority automatic light control mode, by automatically changing the light emission mode to the automatic light control mode, it becomes unnecessary for a user to manually change the light emission mode. By displaying the changed light emission mode, it becomes possible for a user to easily get to know the light emission mode in which the image capture is performed.

Furthermore, when the light emission mode of the flash unit is the continuous shooting-priority automatic light control mode, the selection of the wireless mode of the flash unit is disabled. In the wireless mode, a flash unit placed apart from the main camera unit 100 is fired when the image capturing is performed. This mode is used when it is desired to achieve a good shading expression for a subject or a background image part in a captured image. Therefore, in a case where in the continuous shooting-priority automatic light control mode, when higher priority is given to image quality than to the continuous shooting interval, by disabling the selection of the wireless mode, it becomes possible to prevent the imaging sensitivity from being automatically set to be high in shooting with priority to image quality.

Second Embodiment

Figure 4:
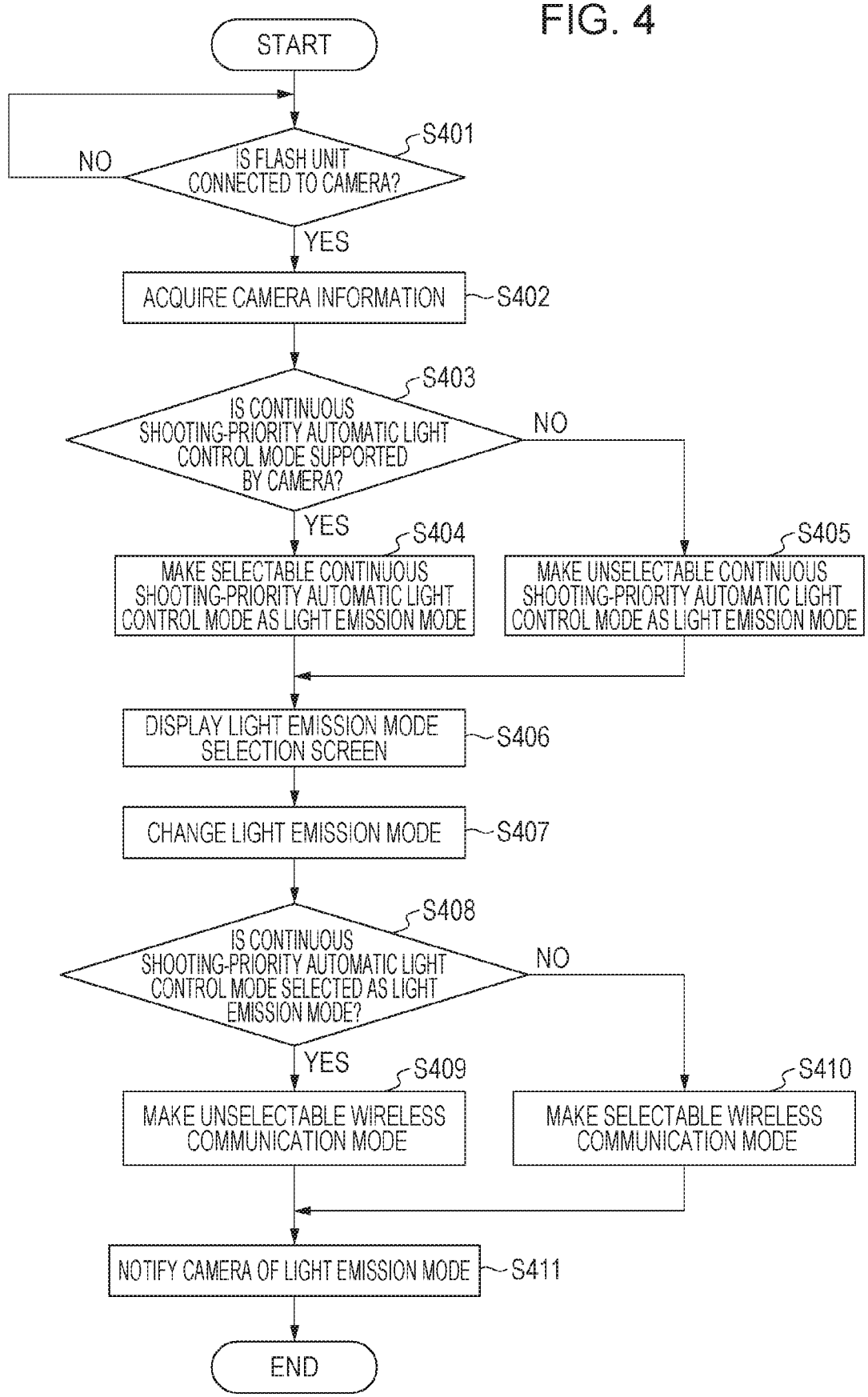
FIG. 4 is a flow chart illustrating an operation of a flash unit in transmission/reception of information between a camera and the flash unit according to a second embodiment of the present disclosure.

Next, with reference to a flow chart shown in FIG. 4, an operation of the flash unit 300 is described below in terms of the transmission/reception of information between the main camera unit 100 and the flash unit 300 according to a second embodiment. FIG. 4 illustrates a sequence mainly performed in step S201 or step S202 shown in FIG. 2. Note that the configuration of the image capturing system according to the present embodiment is similar to that shown in FIG. 1, and thus a further description thereof is omitted.

In step S401, the flash control unit 301 determines whether the flash unit 300 is connected to the main camera unit 100 via the flash contacts 109. In a case where it is determined that the flash unit 300 is connected to the main camera unit 100, the processing flow proceeds to step S402, but otherwise step S401 is repeated.

In step S402, the flash control unit 301 receives camera information from the main camera unit 100. The camera information received in this step is information including light emission mode information indicating light emission modes of the flash unit supported by the camera.

In step S403, the flash control unit 301 determines, from the camera information received in step S402, whether the continuous shooting-priority automatic light control mode is supported by the camera to which the flash unit 300 is connected. In a case where the continuous shooting-priority automatic light control mode is supported, the processing flow proceeds to step S404. In a case where the continuous shooting-priority automatic light control mode is not supported, the processing flow proceeds to step S405.

In step S404, the flash control unit 301 enables the selection of, among light emission modes controllable by the flash unit 300, the continuous shooting-priority automatic light control mode.

In step S405, the flash control unit 301 disables the selection of, among light emission modes controllable by the flash unit 300, the continuous shooting-priority automatic light control mode.

In step S406, the flash control unit 301 displays a selection screen indicating selectable light emission modes determined in step S404 or step S405 according to an operation performed on the flash operation unit 303 by a user. The light emission mode selection screen may be displayed on the flash display unit 304 or the camera display unit 106. In a case where the light emission mode selection screen is displayed on the camera display unit 106, the flash control unit 301 transmits information indicating the selectable light emission modes to the camera control unit 101 via the flash contacts 109. Unselectable light emission modes may be indicated by not displaying the unselectable light emission modes, displaying the unselectable light emission modes in a color different from a color of the selectable light emission modes, displaying a particular icon near each unselectable light emission mode, or any other methods that cause a user to recognize the unselectable light emission modes.

In step S407, the flash control unit 301 changes (sets) the light emission mode depending on an operation performed on the flash operation unit 303 by a user or an operation performed on the camera operation unit 105.

In step S408, the flash control unit 301 determines whether the light emission mode which has been set as a result of the changing in step S407 is the continuous shooting-priority automatic light control mode. In a case where the light emission mode is the continuous shooting-priority automatic light control mode, the processing flow proceeds to step S409, but otherwise the processing flow proceeds to step S410.

In step S409, a flash control unit 301 disables the selection of the wireless mode. The unselectability of the wireless mode may be indicated by, in the communication mode selection screen, not displaying the wireless mode, displaying the wireless mode in color different from a color of the wireless-off mode, displaying a particular icon near the wireless mode, or any other methods that can cause a user to recognize that the wireless mode is unselectable.

In step S410, the flash control unit 301 enables the selection of the wireless mode.

In step S411, the flash control unit 301 transmits, to the camera control unit 101, flash unit information including information indicating the selected light emission mode. Thereafter, the present process is ended.

As described above, when the flash unit is set in the continuous shooting-priority automatic light control mode, the selection of the wireless mode of the flash unit by a user is disabled. This makes it possible to prevent the imaging sensitivity from being automatically set to be high in image capturing in which priority is given to image quality.

Furthermore, by disabling the selection of light emission modes that are not supported by the connected camera by a user, it is possible to prevent inconsistence from occurring between controlling of the main camera unit and controlling of the flash unit.

Furthermore, by performing control such that when the light emission mode of the flash unit is set by operating the main camera unit, a similar result in control is obtained as in a case where the light emission mode of the flash unit is set by operating the flash unit, it becomes possible to set the shooting condition according to an intention of a user regardless of which unit is operated by the user in the setting.

Third Embodiment

Figure 5:
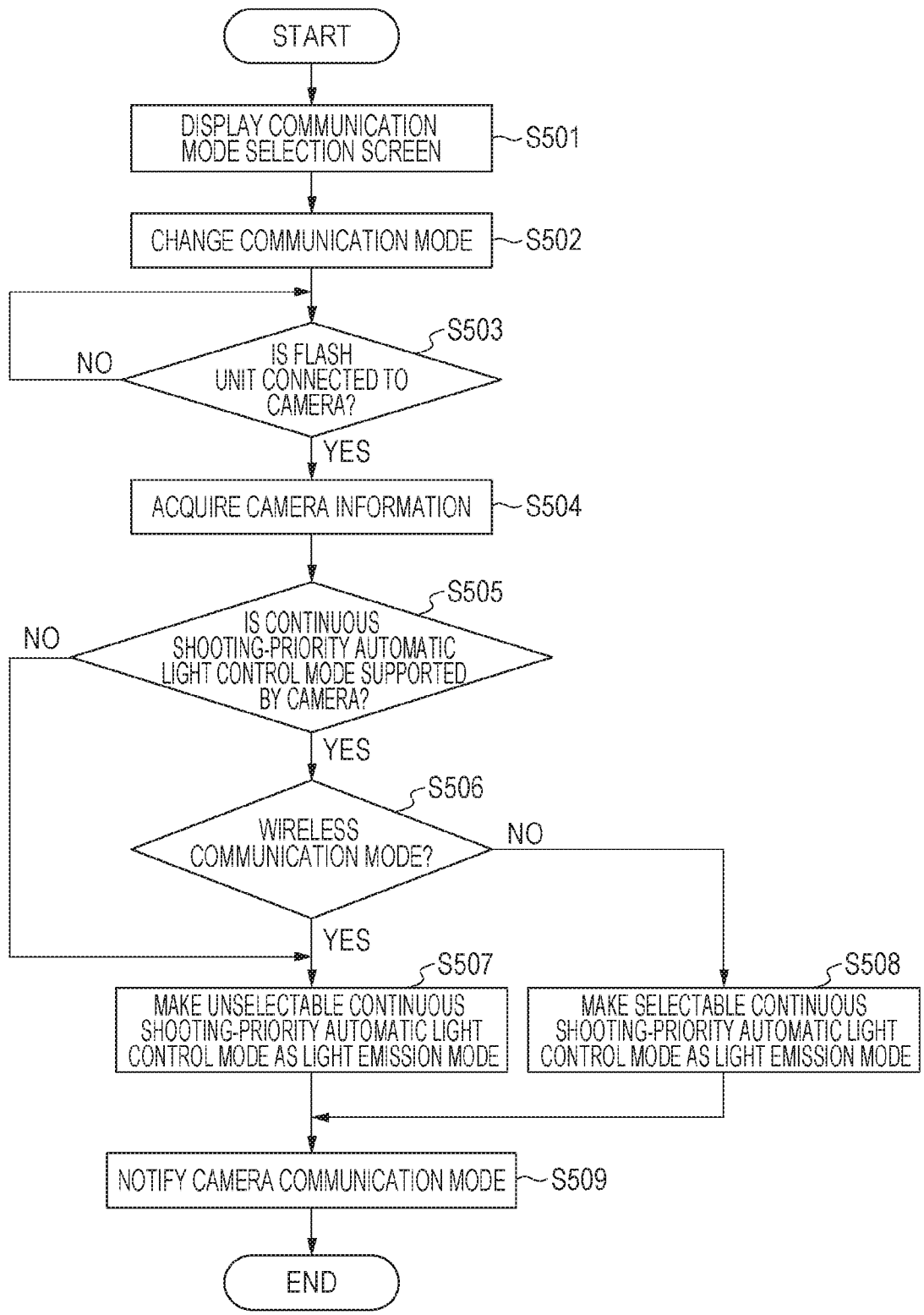
FIG. 5 is a flow chart illustrating an operation of a flash unit in transmission/reception of information between a camera and the flash unit according to a third embodiment of the present disclosure.

Next, with reference to a flow chart shown in FIG. 5, an operation of the flash unit 300 is described below in terms of the transmission/reception of information between the main camera unit 100 and the flash unit 300 according to a third embodiment. FIG. 5 illustrates a sequence mainly performed in step S201 or step S202 shown in FIG. 2. Note that the configuration of the image capturing system according to the present embodiment is similar to that shown in FIG. 1, and thus a further description thereof is omitted.

In step S501, the flash control unit 301 displays a communication mode selection screen on the flash display unit 304 according to an operation performed on the flash operation unit 303 by a user. Modes displayed here include the wireless-off mode, the optical wireless mode, the radio wave wireless mode, and/or the like. A user is allowed to select one of the modes by operating the flash operation unit 303.

In step S502, the flash control unit 301 changes (sets) the communication mode according to an operation performed on the flash operation unit 303 by a user.

In step S503, the flash control unit 301 determines whether the flash unit 300 is connected to the main camera unit 100 via the flash contacts 109. In a case where it is determined that the flash unit 300 is connected to the main camera unit 100, the processing flow proceeds to step S504, but otherwise step S503 is repeated.

In step S504, the flash control unit 301 receives camera information from the main camera unit 100. The camera information received in this step is information including light emission mode information indicating light emission modes of the flash unit supported by the camera.

In step S505, the flash control unit 301 determines, from the camera information received in step S504, whether the continuous shooting-priority automatic light control mode is supported by the main camera unit 100 to which the flash unit 300 is connected. In a case where the continuous shooting-priority automatic light control mode is supported, the processing flow proceeds to step S506, but otherwise the processing flow proceeds to step S507.

In step S506, the flash control unit 301 determines the communication mode set as a result of the changing in step S502. In a case where the communication mode is the wireless mode (the optical wireless mode or the radio wave wireless mode), the processing flow proceeds to step S507, but otherwise the processing flow proceeds to step S508.

In step S507, the flash control unit 301 disables the selection of the continuous shooting-priority automatic light control mode. The unselectable light emission modes may be indicated in a similar manner to the manner in step S406 in FIG. 4, and a further detailed description thereof is omitted.

In step S508, the flash control unit 301 enables the selection of, among light emission modes controllable by the flash unit 300, the continuous shooting-priority automatic light control mode among light emission modes controllable by the flash unit 300.

In step S509, the flash control unit 301 transmits, to the camera control unit 101, flash unit information including communication mode information. Thereafter, the present process is ended.

As described above, when the flash unit is set in the wireless mode, the selection of the continuous shooting-priority automatic light control mode by a user is disabled. This makes it possible to prevent the imaging sensitivity from being automatically set to be high in image capturing in which priority is given to image quality.

Furthermore, by disabling the selection of light emission modes that are not supported by the connected camera by a user, it is possible to prevent inconsistence from occurring between controlling of the main camera unit and controlling of the flash unit.

Fourth Embodiment

Figure 6:
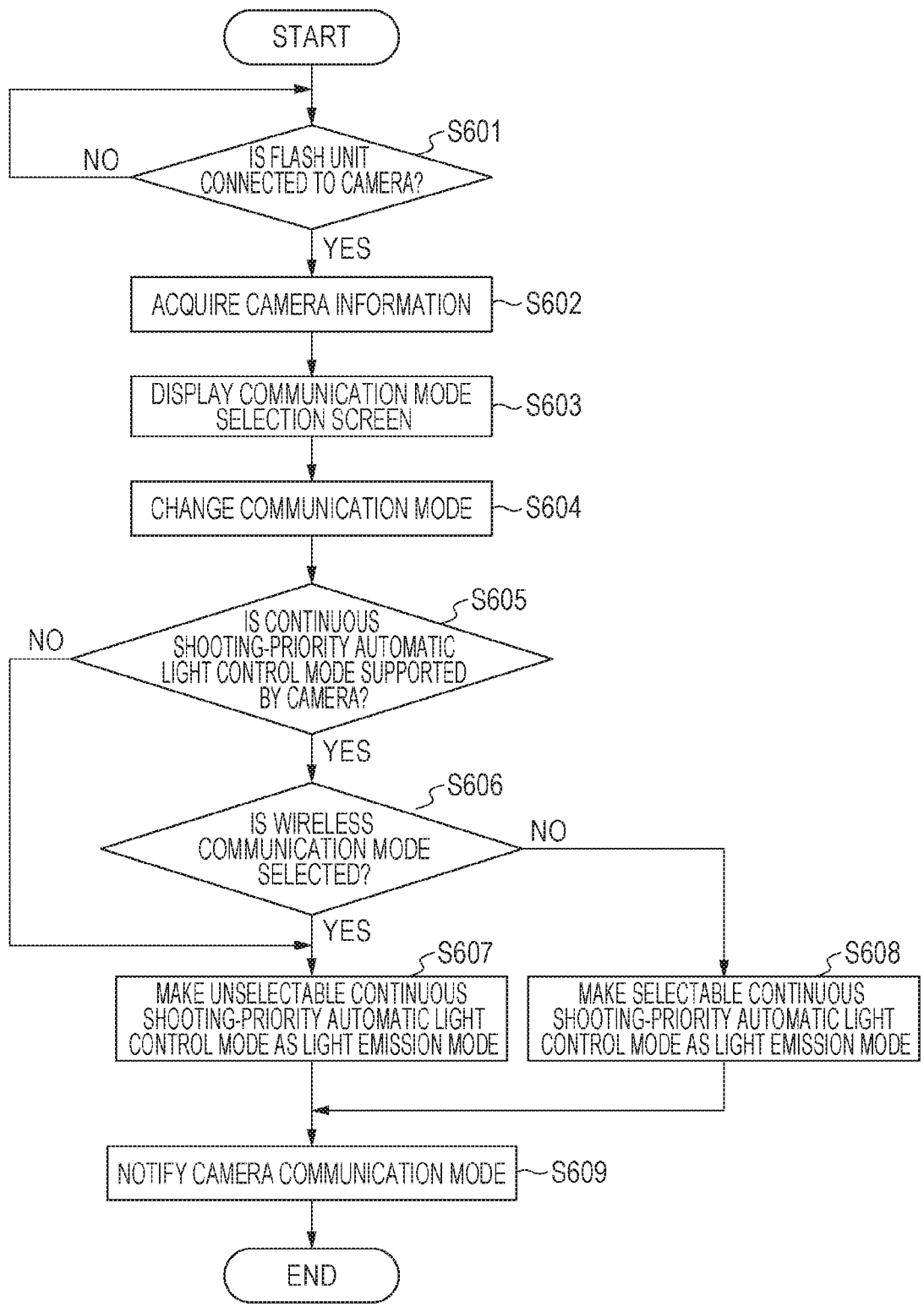
FIG. 6 is a flow chart illustrating an operation of a flash unit in transmission/reception of information between a camera and the flash unit according to a fourth embodiment of the present disclosure.

Next, with reference to a flow chart shown in FIG. 6, an operation of the flash unit 300 is described below in terms of the transmission/reception of information between the main camera unit 100 and the flash unit 300 according to a fourth embodiment. FIG. 6 illustrates a sequence mainly performed in step S201 or step S202 shown in FIG. 2. Note that the configuration of the image capturing system according to the present embodiment is similar to that shown in FIG. 1, and thus a further description thereof is omitted.

In step S601, the flash control unit 301 determines whether the flash unit 300 is connected to the main camera unit 100 via the flash contacts 109. In a case where it is determined that the flash unit 300 is connected to the main camera unit 100, the processing flow proceeds to step S602, but otherwise step S601 is repeated.

In step S602, the flash control unit 301 receives camera information from the main camera unit 100. The camera information received in this step is information including light emission mode information indicating light emission modes of the flash unit supported by the camera.

In step S603, the flash control unit 301 displays a communication mode selection screen on the flash display unit 304 according to an operation performed on the flash operation unit 303 by a user. Communication modes displayed here include the wireless-off mode, the optical wireless mode, the radio wave wireless mode, and/or the like. A user is allowed to select one of the communication modes by operating the flash operation unit 303.

In step S604, the flash control unit 301 changes (sets) the communication mode according to an operation performed on the flash operation unit 303 by a user.

In step S605, the flash control unit 301 determines, from the camera information received in step S602, whether the continuous shooting-priority automatic light control mode is supported by the main camera unit 100 to which the flash unit 300 is connected. In a case where the continuous shooting-priority automatic light control mode is supported, the processing flow proceeds to step S606, but otherwise the processing flow proceeds to step S607.

In step S606, the flash control unit 301 determines the communication mode which has been set as a result of the changing in step S604. In a case where the communication mode is the wireless mode (the optical wireless mode or the radio wave wireless mode), the processing flow proceeds to step S607, but otherwise the processing flow proceeds to step S608.

In step S607, the flash control unit 301 disables the selection of, among light emission modes controllable by the flash unit 300, the continuous shooting-priority automatic light control mode. Unselectable light emission modes may be indicated in a similar manner to the manner in step S406 in FIG. 4, and a further detailed description thereof is omitted.

In step S608, the flash control unit 301 enables the selection of, among light emission modes controllable by the flash unit 300, the continuous shooting-priority automatic light control mode.

In step S609, the flash control unit 301 transmits, to the camera control unit 101, flash unit information including communication mode information. Thereafter, the present process is ended.

As described above, when the flash unit is set in the wireless mode, the selection of the continuous shooting-priority automatic light control mode by a user is disabled. This makes it possible to prevent the imaging sensitivity from being automatically set to be high in image capturing in which priority is given to image quality.

Furthermore, by disabling the selection of light emission modes that are not supported by the connected camera by a user, it is possible to prevent inconsistence from occurring between controlling of the main camera unit and controlling of the flash unit.

Furthermore, by performing control such that when the light emission mode of the flash unit is set by operating the main camera unit, a similar result in control is obtained as in a case where the light emission mode of the flash unit is set by operating the flash unit, it becomes possible to set the shooting condition according to an intention of a user regardless of which unit is operated by the user in the setting.

In the four embodiments described above, control is performed such that when one of the continuous shooting-priority automatic light control mode and the wireless mode is selected, the selection of the other one of the continuous shooting-priority automatic light control mode and the wireless mode is disabled. This makes it possible to prevent the imaging sensitivity from being automatically set to be high in image capturing in which priority is given to image quality, and thus it becomes possible to set the shooting condition according to an intention of a user.

Fifth Embodiment

It is known to configure a camera so as to have an automatic light emission function that works such that when the luminance of the subject is low, if a proper exposure is not obtained even by changing exposure control values such as the shutter speed, the aperture value, the ISO sensitivity or the like, image capturing is performed while illuminating the subject with light by emitting the light from a flash unit functioning as an illumination apparatus. This function is referred to as an automatic light emission function.

Japanese Patent Laid-Open No. 2009-276525 discloses a technique in which the amount of light emission to be employed in the image capturing is calculated from a result of pre-light emission, and, if the amount of light emission calculated from the pre-light emission result is greater than a particular amount of light emission, light is emitted with the particular amount of light emission, and a difference is compensated for by properly selecting the ISO sensitivity.

However, in the technique disclosed in Japanese Patent Laid-Open No. 2009-276525, because the correction of the ISO sensitivity is automatically performed, there is a possibility that in a case where the automatic ISO sensitivity correction function is combined with the automatic light emission function, the ISO sensitivity changes depending on exposure control values determined by the automatic light emission function, which may make it difficult to accomplish good shooting with automatic light emission. Note that the amount of light emission may be great depending on the exposure control values in the shooting with light emission. Therefore, when continuous shooting is performed while emitting light using the illumination apparatus, there is a possibility that an increase in a shooting interval may occur due to charging of the illumination apparatus or controlling of heat dissipation.

In view of the above, the fifth embodiment provides a technique of setting a shooting condition according to an intention of a user when an illumination apparatus is used.

Figure 7:
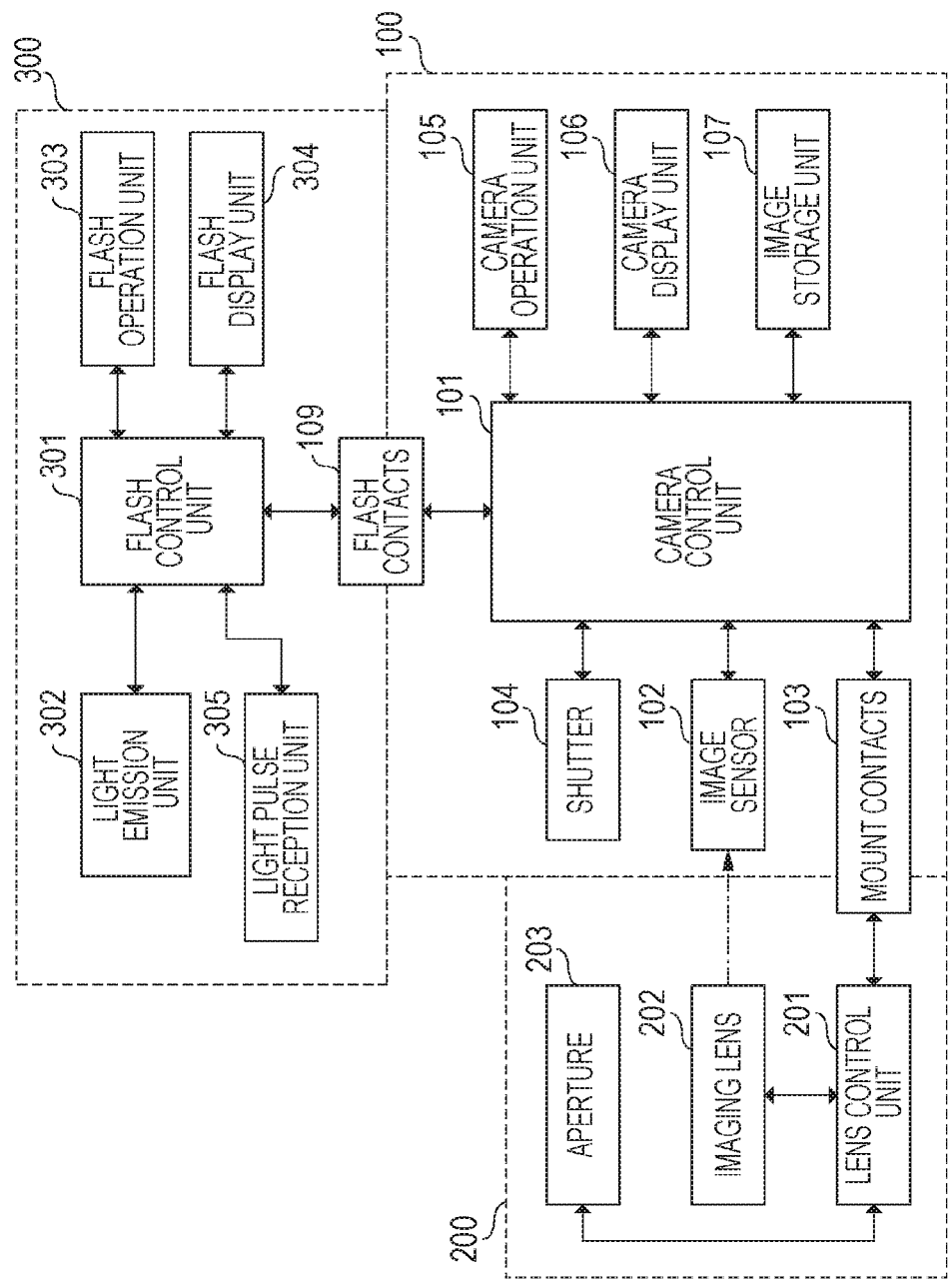
FIG. 7 is a diagram illustrating an example of a configuration of an image capturing system according to a fifth embodiment of the present disclosure.

FIG. 7 is a diagram illustrating an example of a configuration of an image capturing system according to the fifth embodiment of the present disclosure. In the following explanation, a description of units or elements similar to those in the image capturing system shown in FIG. 1 is omitted.

In the present embodiment, the camera operation unit 105 is configured to select a shooting with flash mode of the main camera unit 100 by operating the camera operation unit 105. Selectable shooting with flash modes include an automatic light emission shooting mode, a shooting with forced flash mode, and/or the like. In the automatic light emission shooting mode, a determination as to whether to perform light emission is made based on a result of photometry on a subject and the amount of light emission of the flash unit is automatically set. In the shooting with forced flash mode, the amount of light emission of the flash unit is automatically set without making a determination as to whether to perform light emission based on a photometric measurement result.

The flash unit 300 according to the present embodiment does not include the radio wave transmission/reception unit 306.

Figure 8:
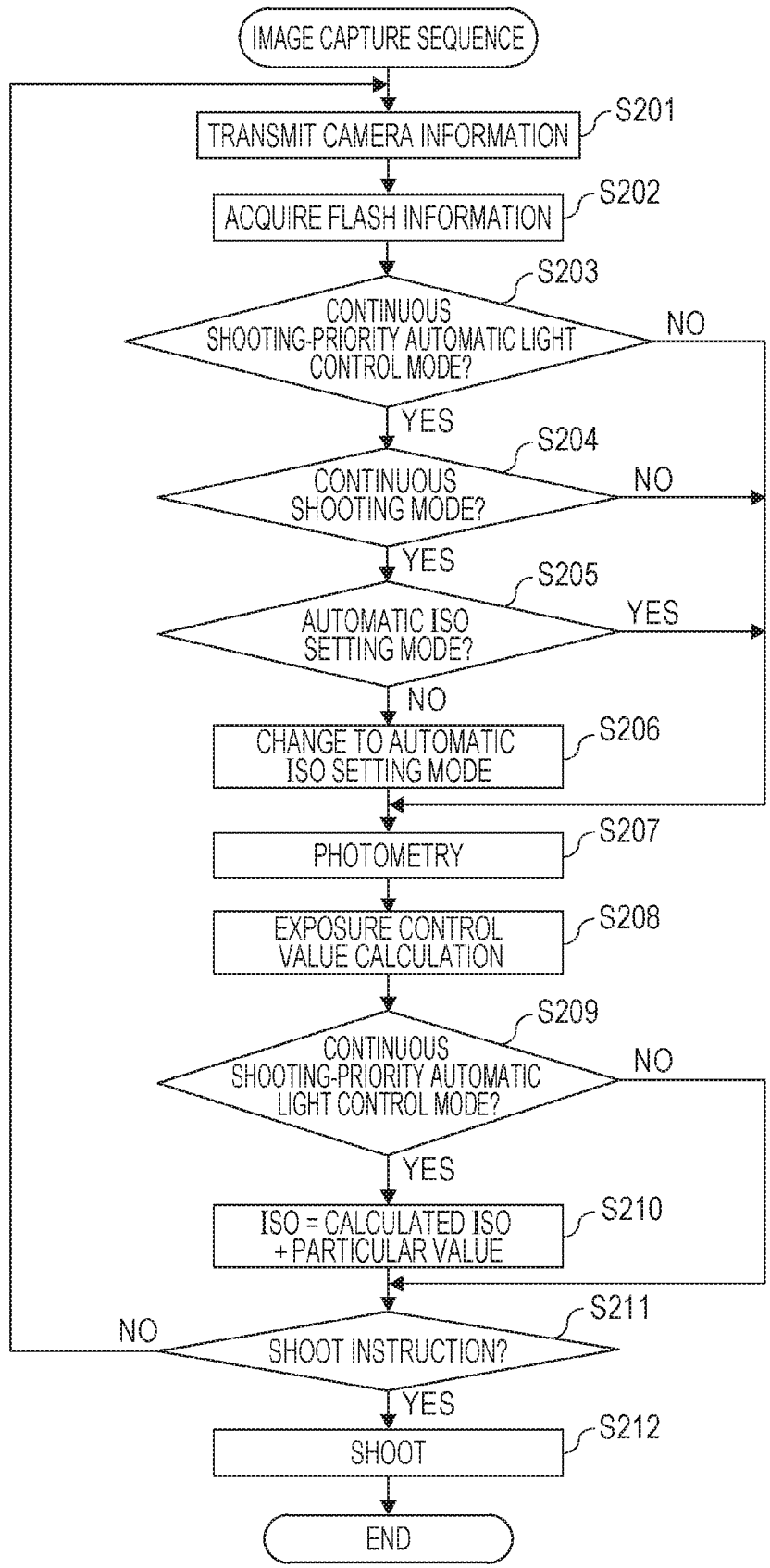
FIG. 8 is a flow chart illustrating an operation of an image capturing system according to the fifth embodiment of the present disclosure.

Referring to a flow chart shown in FIG. 8, an operation of the image capturing system according to the present embodiment is described below. In the following explanation, a description of processing steps similar to those shown in the flow chart of FIG. 2 is omitted.

First, in step S201, the camera control unit 101 transmits camera information to the flash unit 300. The camera information transmitted in this step is information including information indicating a shooting with flash mode set in the camera. Available shooting with flash modes include the shooting with automatic light emission mode, the shooting with forced flash mode, and/or the like.

In step S208, the camera control unit 101 determines exposure control values used in the image capturing such as a shutter speed, an aperture value, an ISO sensitivity, or the like from the photometric measurement result obtained in step S207. In a case where the shooting with automatic light emission mode is set, the camera control unit 101 determines whether shooting with flash is to be performed. More specifically, in a case where the exposure control values determined in step S208 do not provide a proper exposure, the camera control unit 101 determines that the shooting with flash is to be performed.

In step S212, the camera control unit 101 performs image capturing using the shutter speed, the aperture value, and the ISO sensitivity calculated in step S208 or step S210. Thereafter, the present process is ended. In the image capturing operation, in a case where the shooting with forced flash mode is set or in a case where when the shooting with automatic light emission mode is set and it is determined that the shooting with flash is to be performed, light may be emitted by the flash unit in synchronization with the image capturing operation. In a case where the light emission mode of the flash unit is the automatic light control mode or the continuous shooting-priority automatic light control mode, the camera control unit 101 determines the amount of flash light emission and transmits the information indicating the amount of flash light emission to the flash control unit 301 via the flash contacts 109. The amount of flash light emission is determined, for example, such that a pre-light emission is performed and image data is acquired by driving the image sensor 102 in a period from the SW2 operation to the image capturing operation, and the amount of flash light emission may be determined using a known method from the acquired image data and the shutter speed, the aperture value, and the ISO sensitivity to be used in the image capturing.

Next, with reference to a flow chart shown in FIG. 9, an operation of the flash unit 300 is described below in terms of the transmission/reception of information between the main camera unit 100 and the flash unit 300. In the following explanation, a description of processing steps similar to those in the flow chart shown in FIG. 3 is omitted.

In step S304, the flash control unit 301 receives camera information from the main camera unit 100. The camera information received in this step is information including information indicating a shooting with flash mode set in the camera.

In step S305, the flash control unit 301 determines whether the light emission mode which has been set as a result of the changing in step S302 is the continuous shooting-priority automatic light control mode. In a case where the light emission mode is the continuous shooting-priority automatic light control mode, the processing flow proceeds to step S906, but otherwise the processing flow proceeds to step S908.

In step S906, the flash control unit 301 determines, from the camera information received in step S304, whether the shooting with automatic light emission mode is set in the main camera unit 100 to which the flash unit 300 is connected. In a case where the main camera unit 100 is set in the shooting with automatic light emission mode, the processing flow proceeds to step S907, but otherwise the processing flow proceeds to step S908.

In step S907, the flash control unit 301 changes the light emission mode to the automatic light control mode. The light emission mode may be changed temporarily or the changed light emission mode may be maintained. Note that in the temporary change, the light emission mode is set to the automatic light control mode only when the flash unit is in the connection with the camera, but if it is detected that the camera is disconnected, the light emission mode is returned to the continuous shooting-priority automatic light control mode.

In step S908, the flash control unit 301 transmits, to the camera control unit 101, flash unit information indicating the selected light emission mode. Thereafter, the present process is ended.

As described above, when the light emission mode of the flash unit is the continuous shooting-priority automatic light control mode, the image capturing is performed in a condition in which the ISO sensitivity is increased and the amount of light emission of the flash unit is reduced. This allows it to perform shooting with flash according to exposure control values and an amount of light emission suitable for continuous shooting. Furthermore, the changing of the ISO sensitivity is completed before the shoot instruction is issued, and thus a user is allowed to check the imaging sensitivity before starting the image capturing.

Furthermore, also in a state in which the manual setting mode is selected for the setting of the ISO sensitivity, if it is detected that the light emission mode of the flash unit is the continuous shooting-priority automatic light control mode, the mode of setting the ISO sensitivity is changed to the automatic setting mode. Thus, a user does not need to manually change the ISO sensitivity.

Furthermore, in a case where the camera is set in the shooting with automatic light emission mode, by automatically changing the light emission mode of the flash unit to an automatic light control mode corresponding to the shooting with automatic light emission mode thereby making it possible to achieve a good result in shooting with automatic light control. In this case, a user does not need to change the light emission mode. Note that when the light emission mode of the flash unit is set in the continuous shooting-priority automatic light control mode, the shooting with flash mode of the camera may be automatically changed to a shooting with forced flash mode corresponding to the continuous shooting-priority automatic light control mode. That is, when either one of the shooting with automatic light emission mode in the camera and the continuous shooting-priority automatic light control mode in the flash unit is selected, the selection of the other one of the shooting with automatic light emission mode in the camera and the continuous shooting-priority automatic light control mode in the flash unit may be disabled.

While the present disclosure has been described with reference to exemplary embodiments, the present disclosure is not limited to the disclosed exemplary embodiments, and many modifications and changes are possible within the sprit and the scope of the disclosure. For example, the flash unit has the optical wireless mode and the radio wave wireless mode as communication modes. However, the flash unit may not have either one of these communication modes. The flash unit may have a wire communication mode as one of communication modes. When the wire communication mode is set, control may be performed in a similar manner as in the case where the wireless mode is set according to one of the embodiments described above.

In the embodiments described above, the flash unit of the image capturing system has the transmission/reception unit. However, alternatively, in the image capturing system, the main camera unit may have a transmission/reception unit, and a flash unit located apart from the main camera unit may be controlled, in terms of light emission, by the main camera unit using the transmission/reception unit. Alternatively, in the image capturing system, a communication apparatus may be attached to the main camera unit, and a flash unit located apart from the main camera unit may be controlled, in terms of light emission, by the main camera unit using the transmission/reception unit.

At least part of the process executed by the camera control unit in the embodiments described above may be executed by the flash control unit. Conversely, at least part of the process executed by the flash control unit in the embodiments described above may be executed by the camera control unit.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

OTHER EMBODIMENTS

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., CPU, MPU, or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-121366, filed Jun. 26, 2018, and Japanese Patent Application No. 2018-121367, filed Jun. 26, 2018, which are each hereby incorporated by reference herein in their entirety.

What is claimed is:

1. An image capturing system comprising an image capturing apparatus and an illumination apparatus, the image capturing system further comprising:
    a first selection unit configured to select a first mode in which an amount of light emission of the illumination apparatus is automatically set and an imaging sensitivity is automatically set, and a second mode in which the amount of light emission of the illumination apparatus is automatically set and the imaging sensitivity is automatically set to be higher than in the first mode;
    a communication unit configured to perform communication;
    a second selection unit configured to select a wireless communication mode in which a communication with one other different illumination apparatus is performed via the communication unit, and a non-communication mode in which a communication with any other different illumination apparatus is not performed via the communication unit; and
    a control unit configured to perform control such that in a case where one of the second mode and the wireless communication mode is selected, selection is disabled of the other one of the second mode and the wireless communication mode.

2. The image capturing system according to claim 1, further comprising
    a display unit,
    wherein the control unit changes a displaying manner associated with the second mode by the display unit such that the displaying manner is different between when the wireless communication mode is selected and when the non-communication mode is selected.

3. The image capturing system according to claim 2, wherein the control unit controls the display unit to display information associated with the second mode when the non-communication mode is selected, while the control unit controls the display unit not to display information associated with the second mode when the wireless communication mode is selected.

4. The image capturing system according to claim 1, further comprising
    a display unit,
    wherein the control unit changes a displaying manner associated with the wireless communication mode by the display unit such that the displaying manner is different between when the first mode is selected and when the second mode is selected.

5. The image capturing system according to claim 4, wherein the control unit controls the display unit to display information associated with the wireless communication mode when the first mode is selected, while the control unit controls the display unit not to display information associated with the wireless communication mode when the second mode is selected.

6. An image capturing apparatus comprising:
    a first selection unit configured to select a first mode in which an amount of light emission of an illumination apparatus is automatically set and an imaging sensitivity is automatically set, and a second mode in which the amount of light emission of the illumination apparatus is automatically set and the imaging sensitivity is automatically set to be higher than in the first mode;
    a second selection unit configured to select a wireless communication mode in which communication with an illumination apparatus is performed using a communication unit configured to perform a wireless communication, and a non-communication mode in which communication with an illumination apparatus using the communication unit is not performed; and
    a control unit configured to perform control such that in a case where one of the second mode and the wireless communication mode is selected, selection is disabled of the other one of the second mode and the wireless communication mode.

7. An illumination apparatus removably connected to an image capturing apparatus, the illumination apparatus comprising:
    a first selection unit configured to select a first light emission mode in which an amount of light emission is automatically set by the image capturing apparatus, and a second light emission mode in which light emission is performed to be smaller than in the first mode;

a second selection unit configured to select a wireless communication mode in which a communication with one other different illumination apparatus is performed via a communication unit configured to perform a wireless communication, and a non-communication mode in which a communication with any other different illumination apparatus via the communication unit is not performed; and a control unit configured to perform control such that in a case where either one of the second light emission mode and the wireless communication mode is selected, selection is disabled of the other one of the second light emission mode and the wireless communication mode.

8. A method of controlling an image capturing system including an image capturing apparatus and an illumination apparatus, the method comprising:

performing a first selection process to select a first mode in which an amount of light emission of the illumination apparatus is automatically set and an imaging sensitivity is automatically set, and a second mode in which the amount of light emission of the illumination apparatus is automatically set and the imaging sensitivity is automatically set to be higher than in the first mode; and performing a second selection process to select a wireless communication mode in which a communication with one other different illumination apparatus is performed via a communication unit configured to perform a wireless communication, and a non-communication mode in which a communication with any other different illumination apparatus via the communication unit is not performed;

wherein in the first selection process and the second selection process, in a case where either one of the second mode and the wireless communication mode is selected, selection is disabled of the other one of the second mode and the wireless communication mode.

9. An image capturing system comprising an image capturing apparatus and an illumination apparatus, the image capturing apparatus comprising:

a first selection unit configured to select a first mode in which a determination is made, based on a photometric measurement result, as to whether to perform light emission by the illumination apparatus and an amount of light emission of the illumination apparatus is automatically set and an imaging sensitivity is automatically set, and a second mode in which the amount of light emission of the illumination apparatus is automatically set without making a determination, based on a photometric measurement result, as to whether to perform light emission by the illumination apparatus and the imaging sensitivity is automatically set to be higher than in the first mode;

the illumination apparatus comprising:

a second selection unit configured to select a first light emission mode corresponding to the first mode and a second light emission mode corresponding to the second mode, the image capturing system comprising:

a control unit configured to perform control such that in a case where either one of the second mode and the first light emission mode is selected, selection is disabled of the other one of the second mode and the first light emission mode.

10. An image capturing apparatus that performs a shooting with flash using an illumination apparatus, the image capturing apparatus comprising:

a selection unit configured to select a first mode in which a determination is made, based on a photometric measurement result, as to whether to perform light emission by the illumination apparatus and an amount of light emission of the illumination apparatus is automatically set and an imaging sensitivity is automatically set, and a second mode in which the amount of light emission of the illumination apparatus is automatically set without making a determination, based on a photometric measurement result, as to whether to perform light emission by the illumination apparatus and the imaging sensitivity is automatically set to be higher than in the first mode;

a reception unit configured to receive information associated with a light emission mode of the illumination apparatus; and a control unit configured to perform control such that in a case where the reception unit receives information indicating that the light emission mode of the illumination apparatus is a light emission mode corresponding to the first mode, selection is disabled of the second mode.

11. The image capturing apparatus according to claim 10, further comprising a display unit configured to display a mode selectable by the selection unit, wherein the control unit changes a displaying manner associated with the mode selectable by the display unit such that the displaying manner is different between a case where the reception unit receives information indicating that the light emission mode of the illumination apparatus is a light emission mode corresponding to the first mode and a case where the reception unit receives information indicating that the light emission mode of the illumination apparatus is a light emission mode corresponding to the second mode.

12. The image capturing apparatus according to claim 11, wherein the control unit performs control such that in a case where the reception unit receives information indicating that the light emission mode of the illumination apparatus is a light emission mode corresponding to the first mode, information indicating that selection of the second mode is disabled is displayed on the display unit.

13. An illumination apparatus removably connected to an image capturing apparatus, the image capturing apparatus selecting a first mode in which a determination is made, based on a photometric measurement result, as to whether to perform light emission by the illumination apparatus and an amount of light emission of the illumination apparatus is automatically set and an imaging sensitivity is automatically set, and a second mode in which the amount of light emission of the illumination apparatus is automatically set without making a determination, based on a photometric measurement result, as to whether to perform light emission by the illumination apparatus and the imaging sensitivity is automatically set to be higher than in the first mode; the illumination apparatus comprising:

a selection unit configured to select a first light emission mode corresponding to the first mode and a second light emission mode corresponding to the second mode;

a transmission unit configured to transmit information associated with the light emission mode to the connected image capturing apparatus; and a control unit configured to perform control such that in a case where the first light emission mode is selected by the selection unit, the transmission to the image capturing apparatus by the transmission unit is disabled in terms of information indicating that the second light emission mode is available.

14. The illumination apparatus according to claim 13, wherein the control unit performs control such that in a case where the second light emission mode is selected by the selection unit, the transmission unit transmits, to the image capturing apparatus, information indicating that the second light emission mode is available.

15. A method of controlling an image capturing system including an image capturing apparatus and an illumination apparatus, the method comprising:

performing a first selection process to select a first mode in which a determination is made, based on a photometric measurement result, as to whether to perform light emission by the illumination apparatus and an amount of light emission of the illumination apparatus is automatically set and an imaging sensitivity is automatically set, and a second mode in which the amount of light emission of the illumination apparatus is automatically set without making a determination, based on a photometric measurement result, as to whether to perform light emission by the illumination apparatus and the imaging sensitivity is automatically set to be higher than in the first mode;

performing a second selection process to select a first light emission mode corresponding to the first mode and a second light emission mode corresponding to the second mode, wherein in the first selection process and the second selection process, in a case where either one of the second mode and the first light emission mode is selected, selection is disabled of the other one of the second mode and the first light emission mode.

* * * * *